United States Patent
Chaganti et al.

(10) Patent No.: US 10,114,677 B2
(45) Date of Patent: Oct. 30, 2018

(54) METHOD AND SYSTEM FOR WORKLOAD RECOMMENDATIONS ON INFORMATION HANDLING SYSTEMS

(71) Applicant: Dell Products L.P., Round Rock, TX (US)

(72) Inventors: Ravikanth Chaganti, Bangalore (IN); Rizwan Ali, Cedar Park, TX (US); Dharmesh M. Patel, Round Rock, TX (US)

(73) Assignee: Dell Products L.P., Round Rock, TX (US)

(*) Notice: Subject to any disclaimer, the term of this patent is extended or adjusted under 35 U.S.C. 154(b) by 128 days.

(21) Appl. No.: 15/177,154

(22) Filed: Jun. 8, 2016

(65) Prior Publication Data
US 2017/0357533 A1    Dec. 14, 2017

(51) Int. Cl.
| | | |
|---|---|---|
| G06F 9/46 | (2006.01) | |
| G06F 9/50 | (2006.01) | |
| G06F 17/30 | (2006.01) | |
| G06F 9/455 | (2018.01) | |

(52) U.S. Cl.
CPC ...... G06F 9/5011 (2013.01); G06F 17/30011 (2013.01); *G06F 9/45533* (2013.01)

(58) Field of Classification Search
None
See application file for complete search history.

(56) References Cited

U.S. PATENT DOCUMENTS

| | | | | |
|---|---|---|---|---|
| 7,366,685 | B2 * | 4/2008 | Emerick | G06F 9/5011 705/26.41 |
| 8,195,525 | B2 * | 6/2012 | Emerick | G06F 9/5011 705/26.41 |
| 8,266,254 | B2 * | 9/2012 | Garrison | G06F 9/5061 709/220 |
| 8,392,928 | B1 | 3/2013 | Forys et al. | |
| 8,589,916 | B2 * | 11/2013 | Gao | G06F 8/61 717/174 |
| 8,751,283 | B2 * | 6/2014 | Bobak | G06Q 10/06 705/301 |

(Continued)

OTHER PUBLICATIONS

Fu et al. "Solution Templates Tool for Enterprise Business Applications Integration", 2008 IEEE, pp. 314-319.*

(Continued)

*Primary Examiner* — Van Nguyen
(74) *Attorney, Agent, or Firm* — Baker Botts L.L.P.

(57) ABSTRACT

An infrastructure manager for an information handling system is disclosed. The infrastructure manager includes a solution property extractor service, a data store, and a visualization engine. The solution property extractor service may extract solution details from a solution template queried from a solution template repository and may transform the solution details into a document. The solution details may include infrastructure information and workload information from the solution template. The data store may store the document. The visualization engine may access the data store to extract components required by the document, determine whether the existing components of the information handling system correlate to the components required by the document, and display the recommended workload.

17 Claims, 8 Drawing Sheets

(56) References Cited

U.S. PATENT DOCUMENTS

| | | | | |
|---|---|---|---|---|
| 9,495,651 B2* | 11/2016 | O'Sullivan | ............ | G06Q 30/06 |
| 9,575,811 B2* | 2/2017 | Farhan | ................ | H04L 67/1002 |
| 9,600,308 B2* | 3/2017 | Agrawal | ............ | G06F 11/3495 |
| 9,612,853 B2* | 4/2017 | Agrawal | ............. | G06F 9/45533 |
| 9,747,121 B2* | 8/2017 | Kelly | .................. | G06F 9/45558 |
| 2006/0080412 A1* | 4/2006 | Oprea | ................ | H04L 41/0843 |
| | | | | 709/220 |
| 2010/0049851 A1* | 2/2010 | Garrison | .............. | G06F 9/5061 |
| | | | | 709/226 |

OTHER PUBLICATIONS

Huang et al. "Platform-Independent Model Templates for Business Process Integration and Management Solutions", 2003 IEEE, pp. 617-622.*

Advisors & Tools—Get Advice on Constructing IT Solutions by Dell, at http://dell.com/advisors, 10 pages, printed Jun. 8, 2016.

U.S. Appl. No. 14/846,375, filed Sep. 4, 2015, entitled Method and System for Providing Continuous Reference Architecture and Bill of Material Modeling, 27 pages.

* cited by examiner

METHOD AND SYSTEM FOR WORKLOAD RECOMMENDATIONS ON INFORMATION HANDLING SYSTEMS

BACKGROUND

Field of the Disclosure

This disclosure relates generally to information handling systems and more particularly to workload recommendations.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may process, store, and communicate information and may include one or more computer systems, data storage systems, and networking systems.

Increasingly, information handling systems are deployed in architectures that allow multiple operating systems to run on a single information handling system. Labeled "virtualization," this type of information handling system architecture decouples software from hardware and presents a logical view of physical hardware to software. In a virtualized information handling system, a single physical server may instantiate multiple, independent virtual servers. Server virtualization is enabled primarily by a piece of software (often referred to as a "hypervisor") that provides a software layer between the server hardware and the multiple operating systems, also referred to as guest operating systems (guest OS). The hypervisor software provides a container that presents a logical hardware interface to the guest operating systems. An individual guest OS, along with various applications or other software executing under the guest OS, may be unaware that execution is occurring in a virtualized server environment (as opposed to a dedicated physical server). Such an instance of a guest OS executing under a hypervisor may be referred to as a "virtual machine".

Often, virtualized architectures may be employed for numerous reasons, e.g., (1) increased hardware resource utilization; (2) cost-effective scalability across a common, standards-based infrastructure; (3) workload portability across multiple servers; (4) streamlining of application development by certifying to a common virtual interface rather than multiple implementations of physical hardware; and/or (5) encapsulation of complex configurations into a file that is easily replicated and provisioned, among other reasons. As noted above, the information handling system may include one or more operating systems, for example, executing as guest operating systems in respective virtual machines.

An operating system serves many functions, such as controlling access to hardware resources and controlling the execution of application software. Operating systems also provide resources and services to support application software. These resources and services may include data storage, support for at least one file system, a centralized configuration database (such as the registry found in Microsoft Windows operating systems), a directory service, a graphical user interface, a networking stack, device drivers, and device management software. In some instances, services may be provided by other application software running on the information handling system, such as a database server.

The information handling system may include multiple processors connected to various devices, such as Peripheral Component Interconnect ("PCI") devices and PCI express ("PCI-E") devices. The operating system may include one or more drivers configured to facilitate the use of the devices. As mentioned previously, the information handling system may also run one or more virtual machines, each of which may instantiate a guest operating system. Virtual machines may be managed by a virtual machine manager, such as, for example, a hypervisor. Certain virtual machines may be configured for device passthrough, such that the virtual machine may utilize a physical device directly without requiring the intermediate use of operating system drivers.

Current information handling systems may benefit from increased performance of virtual machines as their utilization increases. Improved performance may also benefit systems where multiple virtual machines operate concurrently. Applications executing under a guest OS in a virtual machine may also be part of a workload running on the information handling system. The use of information handling systems for workloads has increased in recent years. Likewise, demand for pre-validated workloads has increased in recent years. Broadly speaking, a workload may be an application, or set of applications, designed to provide a solution for a pre-defined purpose.

SUMMARY

In one aspect, a disclosed method includes extracting solution details from a solution template queried from a solution template repository, wherein the solution details include infrastructure information and workload information from the solution template. The method may include transforming the solution details into a document and may include storing the document in a data store. The method may also include obtaining existing components of the information handling system. The method may further include accessing the data store to extract components required by the document corresponding to at least one of: the infrastructure information and/or the workload information. The method may yet also include determining whether the existing components of the information handling system correlated to the components required by the document and may include displaying the recommended workload based on the determination that the existing components of the information handling system correlate to the components required by the document, wherein the recommended workload includes the infrastructure information and workload information from the document. The method may include deploying the recommended workload based on a selection of the recommended deployment method.

In certain embodiments, the method may include, at an interval, updating the document in the data store using a query sent to the solution template repository. The method may further include obtaining monitoring data of the existing components of the information handling system and displaying a resource utilization for the selected workload based on the monitoring data.

Another disclosed aspect includes an information handling system, comprising a processor subsystem having access to memory and an infrastructure manager. The memory may store instructions executable by the processor to deploy a recommended workload.

A further disclosed aspect includes an infrastructure manager for an information handling system, comprising a solution property extractor service, a data store, and a visualization engine. The solution property extractor service may extract solution details from a solution template queried from a solution template repository and transform the solution details into a document. The solution details include infrastructure information and workload information from the solution template. The data store may store the document. The visualization engine may access the data store to extract components required by the document, determine whether the existing components of the information handling system correlate to the components required by the document, and display a recommended workload based on the determination that the existing components of the information handling system correlate to the components required by the document. The components required by the document may correspond to at least one of the infrastructure information and/or the workload information.

An additional disclosed aspect includes an article of manufacture comprising a non-transitory computer-readable medium storing instructions executable by the processor.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
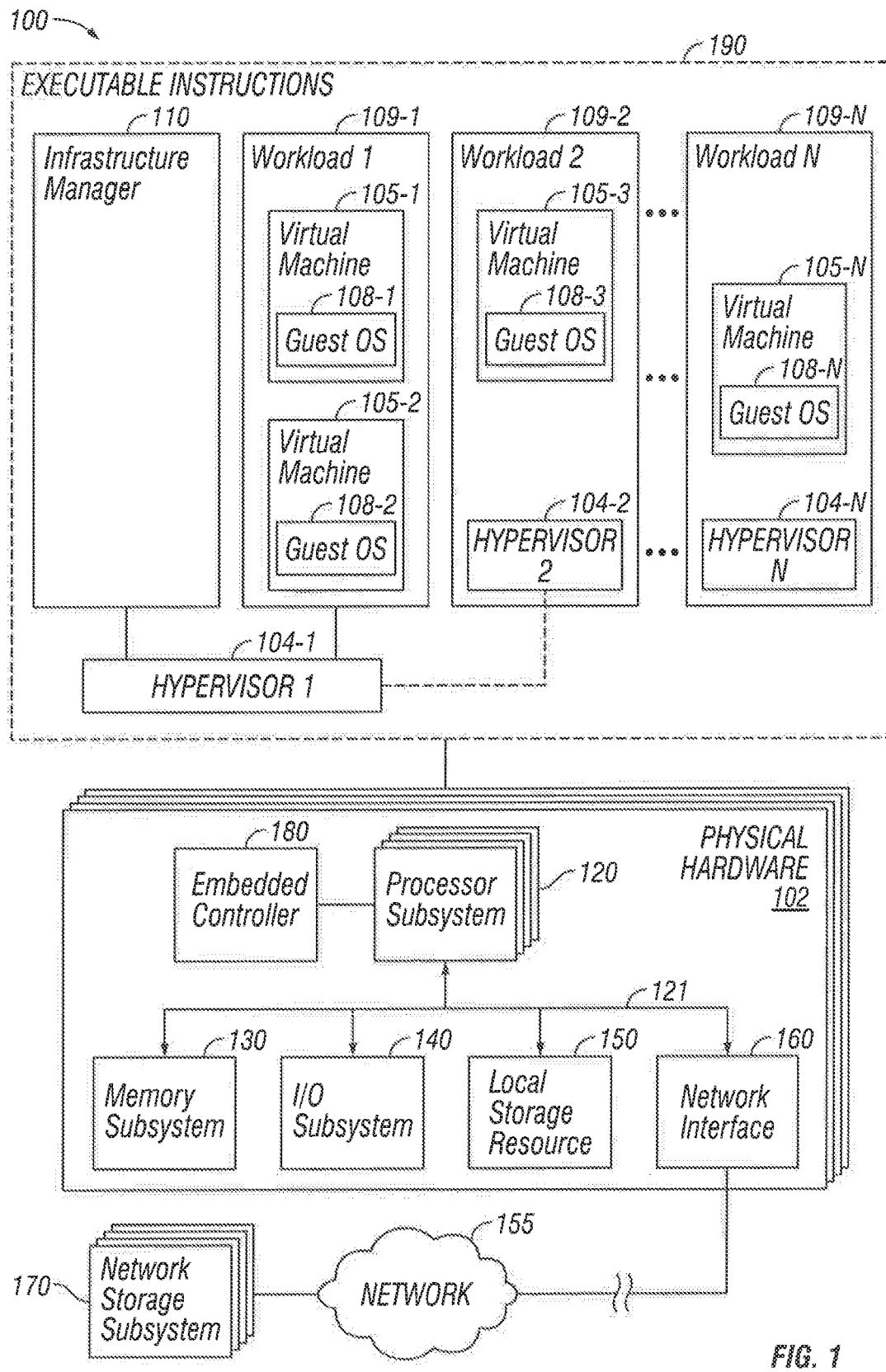
FIG. 1 is a block diagram of selected elements of an information handling system, in accordance with embodiments of the present disclosure.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a server, a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Information handling systems may include one or more workloads or workload architectures for performing one or more tasks. Information handling systems may demand ever increasing number, size, and/or complexity of workloads, while supporting ever decreasing complexity for the user. Accordingly, information handling systems may include automated management. Infrastructure managers may provide for automated management of information handling systems. An existing information handling system for a user may be referred to as a brown-field infrastructure because the hardware of the information handling system is at least partly deployed for the user, and a new information handling system for a user may be referred to as a green-field infrastructure because the hardware of the information handling system is not yet deployed.

As information handling systems become widespread, support for brown-field infrastructures become increasingly desirable. In particular, a user may not be able to purchase or may be limited in purchasing new infrastructure. Moreover, a user may not be aware of the specifics of their own brown-field infrastructure, including any hardware, software, and/or combination of hardware and software. For example, the user of an information handling system may not be aware of the number of licenses purchased for a particular operating system. Workload recommendations, therefore, for brown-field infrastructures may be desired to assist a user.

As workloads on information handling systems become more complex, support for pre-designed and/or pre-validated workloads becomes more desirable. Workloads may be pre-designed to operate with a particular architecture, including the hardware required to operate the workload, the software to operate the workload, and/or the configuration required to enable the software to operate the workload properly on the hardware. Pre-design may include designing the workload prior to evaluation, recommendation, and/or deployment of the workload for a user of an information handling system. Workloads may also be pre-validated to ensure proper operation in practice. Pre-validation may include testing a particular workload on a particular architecture to verify operation, performance, efficiency, and/or utilization. Pre-validation may occur prior to evaluation, recommendation, and/or deployment of the workload on an information handling system for a user of an information handling system. Therefore, workloads that are easier to deploy due to pre-design and/or pre-validation may be desired.

As workloads on information handling systems become more commonly deployed, the demand for automating the task of deployment and/or configuration may increase. Automation bundles may facilitate the automatic deployment of workloads, including deployment and/or configuration. A user may rely on an automation bundle to deploy a new workload to a green-field or brown-field infrastructure. Therefore, workloads with automation bundles may be desired.

As will be described in further detail, the inventors of the present disclosure have developed methods and systems disclosed herein for workload recommendations on information handling systems. The workload recommendations may be identified, displayed, and/or deployed to improve the functioning of an information handling system, including but not limited to improving the performance of the information handling system with higher performance workloads and/or more efficient workloads that utilize the brown-field or existing infrastructure more efficiently, and/or improving the utilization of a brown-field or existing infrastructure by deploying additional workloads or more highly optimized workloads. In particular, workload recommendations enable proper scaling of hardware and/or software, including but not limited to scaling for actual, measured demands of the information handling system, and/or scaling for estimated demands of the information handling system based on laboratory data, without purchasing new hardware and/or software. Users of information handling systems typically lack of the requisite knowledge regarding deployable workload solutions, which may be pre-designed and pre-validated. Providers of information handling systems typically lack the requisite knowledge regarding the brown-field or existing infrastructure, including but not limited to hardware components, software components, software licenses, information handling system configuration, and/or utilization of the information handling system. Thus, workload recommendations may be desired to improve the function of brown-field or existing infrastructures.

Particular embodiments are best understood by reference to FIGS. 1-8 wherein like numbers are used to indicate like and corresponding parts.

Turning now to the drawings, FIG. 1 illustrates a block diagram of selected elements of an embodiment of information handling system 100, in accordance with embodiments of the present disclosure. Information handling system 100 may include software in any suitable form, including executable instructions 190, and may include physical hardware 102. Physical hardware 102 of the information handling system 100 may include, but are not limited to, processor subsystem 120, embedded controller 180, and system bus 121 that communicatively couples various system components to processor subsystem 120 including, for example, memory subsystem 130, I/O subsystem 140, local storage resource 150, and network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

Network interface 160 may be a suitable system, apparatus, or device operable to serve as an interface between information handling system 100 and a network 155. Network interface 160 may enable information handling system 100 to communicate over network 155 using a suitable transmission protocol and/or standard. In some embodiments, network interface 160 may be communicatively coupled via network 155 to a network storage subsystem 170. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). The network may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof.

As depicted in FIG. 1, processor subsystem 120, which may comprise one or more processors, may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. Each processor in the processor subsystem 120 may contain one or more cores or functional units for performing tasks. In some embodiments, processor subsystem 120 may interpret and/or execute program instructions and/or process data stored locally (e.g., in memory 130 and/or another component of physical hardware 102). In the same or alternative embodiments, processor subsystem 120 may interpret and/or execute program instructions and/or process data stored remotely (e.g., in a network storage resource).

Memory subsystem 130 may comprise a system, device, or apparatus operable to retain and/or retrieve program instructions and/or data for a period of time (e.g., computer-readable media). In an embodiment of FIG. 1, memory 130 stores an operating system, which may represent instructions executable by processor subsystem 120 to operate information handling system 100 after booting. It is noted that in different embodiments, an operating system may be stored at the network storage resource and may be accessed by processor subsystem 120 via the network. Memory 130 may comprise random access memory (RAM), electrically erasable programmable read-only memory (EEPROM), a PCM-CIA card, flash memory, magnetic storage, opto-magnetic storage, and/or a suitable selection and/or array of volatile or non-volatile memory that retains data after power to its associated information handling system, such as information handling system 100, is powered down.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. For example, local storage resource 150 may store executable code in the form of program files that may be loaded into memory 130 for execution, such as an operating system. In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. For example, I/O subsystem 140 may include a Peripheral Component Interconnect Express (PCI-E) interface that is supported by processor subsystem 120. Often I/O subsystem 140 is referred to as a "chipset" to indicate a collection of integrated circuits that are usable with a given implementation of processor subsystem 120.

Executable instructions 190 may include an infrastructure manager 110, a hypervisor 104-1, and one or more workloads 109. Each workload may be the same or different than other workloads. For example, "Workload 1" 109-1 may include two virtual machines 105-1 and 105-2. Each virtual machine may include a guest operating system 108. "Workload 2" 109-2 may include a virtual machine 105-3 with a guest operating system 108-3, and a hypervisor 104-2. Hypervisor 104-2 may be configured to interface with hypervisor 104-1 to provide guest operating system 108-3 with access to one or more components of the physical hardware 102.

Each hypervisor 104 may be any suitable type of hypervisor for an information handling system, including, but not limited to, VMware vSphere and Microsoft Hyper-V. Each workload may interface with hypervisor 104-1 and include one or more virtual machines. Each hypervisor may correspond to any suitable hardware, including physical hardware 102, one or more processors in processor subsystem 120, or another physical infrastructure. Each virtual machine in a workload may correspond to one or more applications suitable for execution on an information handling system, including, but not limited to, SharePoint, Skype for Business, SQL Server, Exchange Server, virtual desktop infrastructure (VDI), cloud-client computing, high-performance computing (HPC), and/or big data analytics.

Infrastructure manager 110 may operate on information handling system 100 to manage the infrastructure and its associated resources. Although an infrastructure manager is shown in association with to hypervisor 104-1, infrastructure manager 110 may be associated with any number of hypervisors, including hypervisors associated with other physical hardware in the information handling system. The infrastructure manager may configure the information handling system for particular workloads, which may be deployed using an automation bundle. Information handling system 100 may also be monitored by an infrastructure manager to track or measure one or more metric associated with the performance and/or usage of the information handling system. Although virtualized workloads are shown here, a workload may be virtualized or non-virtualized. A non-virtualized workload may be associated with independent physical hardware and may not include a hypervisor, virtual machine, or guest operating system.

Figure 2:
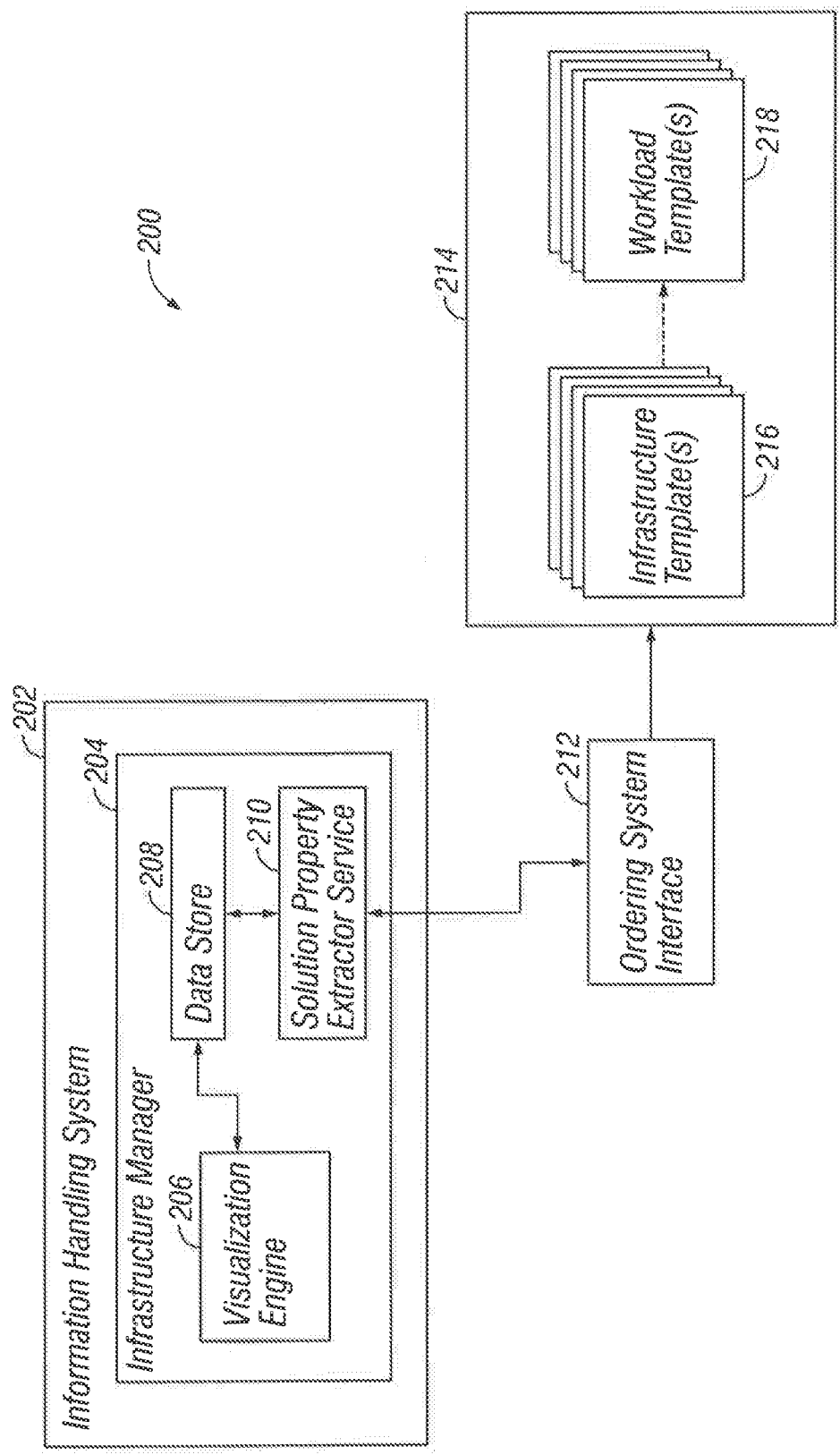
FIG. 2 is a block diagram of selected elements of a workload recommendation solution for a brown-field information handling system, in accordance with embodiments of the present disclosure.

Referring now to FIG. 2, a block diagram of selected elements of a workload recommendation solution for a brown-field information handling system, in accordance with embodiments of the present disclosure is shown. The brown-field workload recommendation solution 200 may include an existing information handling system 202, an ordering system interface 212, and a solution database 214. Infrastructure manager 204 may be included in information handling system 202, and include a visualization engine 206, data store 208, and solution property extractor service 210. The information handling system 202 and infrastructure manager 204 may be the same as or similar to information handling system 100 and infrastructure manager 110, respectively, in FIG. 1.

The solution database 214 may include infrastructure templates 216 linked to workload templates 218. Solution database 214 may be identical to a sales solution repository for use in the sales of information handling systems. Each infrastructure template 216 may be linked to one or more workload templates 218.

The ordering system interface 212 may process queries to the solution database 214 to obtain infrastructure and workload information. These queries may be restricted to prevent modification of the solution database 214 or access to sales-specific information. The restriction may include any suitable limitation, including read-only queries, prohibition of queries to unpublished solutions, and/or prohibition of queries to any cost related detail in the templates.

The solution property extractor service 210 of the infrastructure manager 204 may leverage the ordering system interface 212 to read the sales solution template information in order to extract the component specification for one or more workloads relevant to the identified infrastructure present on the information handling system. The component specification may include the relevant infrastructure templates and workloads templates, which may include a bill of materials (BOM). In one embodiment, the infrastructure present on the information handling system fully restricts the workload solutions, which may exclude workload solutions that require additional infrastructure. In another embodiment, the infrastructure present on the information handling system may partially restrict the workload solutions, which may enable the selection of workload solutions that require additional infrastructure.

The solution property extractor service 210 may transform the component specification into a database formatted file, which may be stored in data store 208. The database formatted file may include the physical component architecture or BOM, and/or one or more workload solutions.

Each workload solution in the data store 208 may include sizing details for scale-out and scale-up of a workload and/or may include configuration details for individual machines or virtual machines.

The database formatted file transformed from the component specification may conform to the type of database used for data store 208. For example, a database file or document formatted in JavaScript Object Notation (JSON) may be stored in a NoSQL database. Although a JSON file and a NoSQL database may be described here, any suitable file format may be used and database type may be used, including, but not limited to, SQL Server, Hadoop, MongoDB, or DocumentDB. Data store 208 may include one or more documents or files with component specifications for a given workload. In one embodiment, data store 208 or solution property extractor service 210 may periodically query or poll the ordering system interface 212 to update existing files and/or to receive new workloads for existing infrastructures. The frequency of the query may vary according to the number of updates and/or additions provided by solution database 214. In another embodiment, the update may be a push, in which the ordering system 212 notifies or sends updates to the data store 208 or solution property extractor service 210 when an update becomes available.

Data store 208 may be accessed by visualization engine 206, which may also be included in the infrastructure manager 204. Visualization engine 206 may access data store 208 to determine which infrastructure templates and workload templates are available. This access may include identifying the required components for each infrastructure template and each workload template. Visualization engine 206 may correlate or match the available templates and/or required components to the components deployed in information handling system 202 to determine whether any infrastructure and/or workload templates may be reused or recycled on the existing deployment. Visualization engine 206 may then display visualizations for the physical or virtual infrastructure and/or the workload solution architecture based on the determination that one or more infrastructure and/or workload templates may be reused. The displayed visualization is described in more detail in FIG. 4. A user of the infrastructure manager may consider whether to deploy a particular solution, which may include any suitable criteria, including the number of end users serviced by the solution and/or the resources required by the solution.

Figure 3:
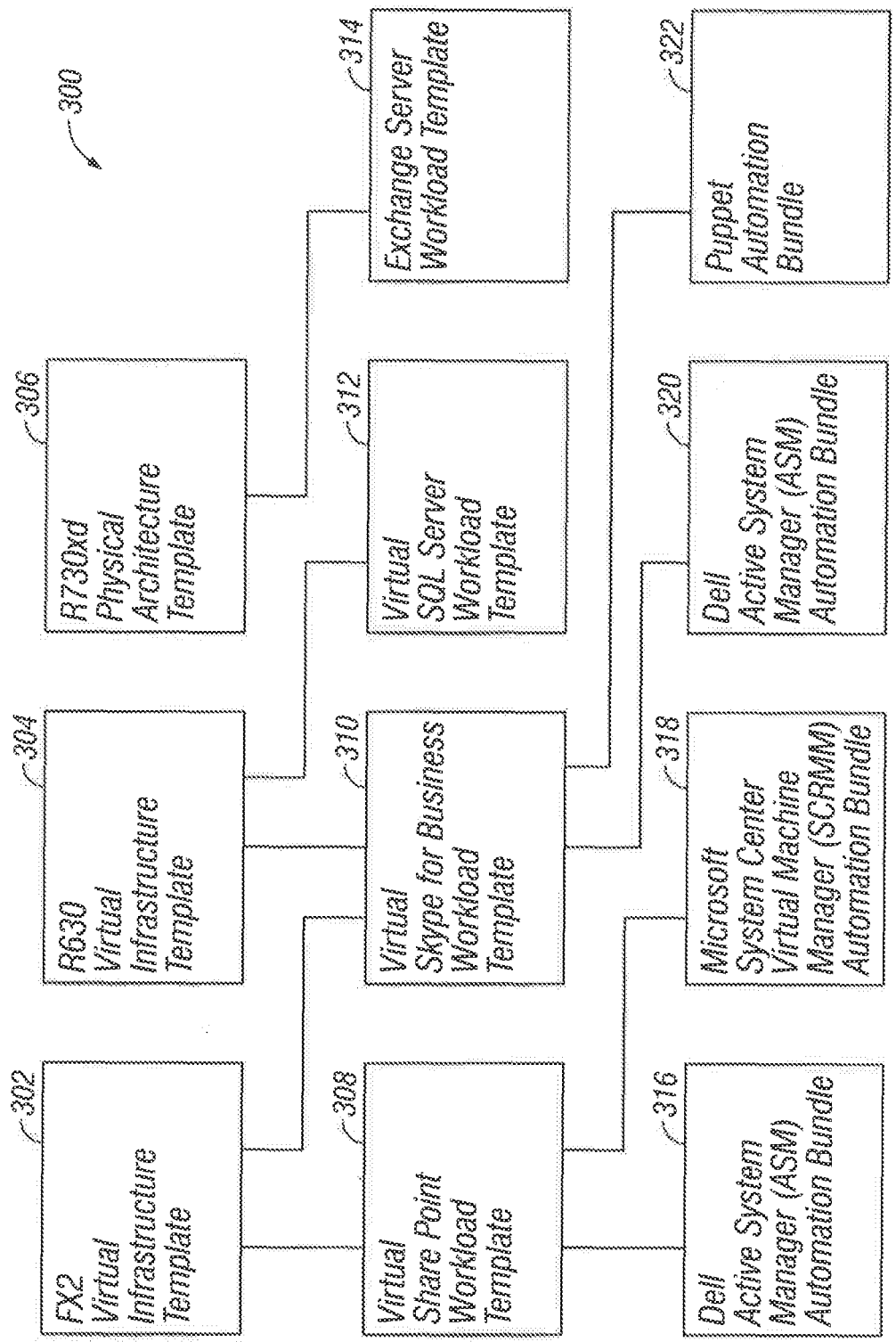
FIG. 3 is a block diagram of linked solution templates, in accordance with embodiments of the present disclosure.

Referring now to FIG. 3, a block diagram of linked solution templates 300, in accordance with embodiments of the present disclosure is shown. Infrastructure manager 204 and ordering system interface 212 may collectively obtain linked solution templates 300 based on the type of infrastructure manager used. For example, a Puppet infrastructure manager may include Puppet automation bundle 322 to automate deployment of workloads, which may be linked to a workload template for Skype for Business 310 executing in a virtualized environment. Workload template 310 may be linked within solution database 214 to an infrastructure template for a Dell R630 server supporting virtualization.

Each infrastructure template may link to one or more workload templates. For example infrastructure template 302 for FX2 servers supporting virtualization may be linked to two workload templates, which may include virtual SharePoint workload template 308 and virtual Skype for Business workload template 310. In contrast, infrastructure template 306 for Dell R730xd servers supporting a physical, non-virtualized architecture may be linked to only one workload template 314 for Exchange Server.

Some infrastructure templates may be exclusively virtualized. For example, the infrastructure template 302 for a Dell FX2 server may only be linked to virtualized workloads for SharePoint workload template 308 and Skype for Business workload template 310. Other infrastructure templates may be exclusively non-virtualized. For example, the infrastructure template 306 for a Dell R730xd server may only be linked to non-virtualized workloads, such as the workload template 314 for Exchange Server. Although infrastructure templates that are exclusively virtualized or non-virtualized are shown, infrastructure templates may support one or more virtualized workloads and/or one or more non-virtualized workloads.

Each workload template may be linked to one or more infrastructure templates. For example, the workload template 310 for Skype for Business may be linked to infrastructure template 302 for a Dell FX2 server supporting virtualization and infrastructure template 304 for a Dell R630 server supporting virtualization. In contrast, the workload template 312 for a Virtual SQL Server may be linked exclusively to infrastructure template 304 for a Dell R630 server. Each workload template may also be linked to zero or more automation bundles. For example, the virtual SharePoint workload template 308 may be linked to a Dell Active System Manager (ASM) automation bundle 316 and to a Microsoft System Center Virtual Machine Manager (SCVMM) automation bundle 318. These automation bundles may be used in Dell ASM and Microsoft SCVMM respectively to automated deployment of the workload template. While some workload templates are linked to automation bundles, some workload templates lack a link to any automation bundle. The Virtual SQL Server workload template 312 and the Exchange Server workload template 314, for example, do not have any link to an automation bundle. A user may still deploy these workloads on existing brown-field infrastructure; however, the infrastructure manager may not be able to automatically deploy and manage the workload without user intervention and/or guidance.

Figure 4:
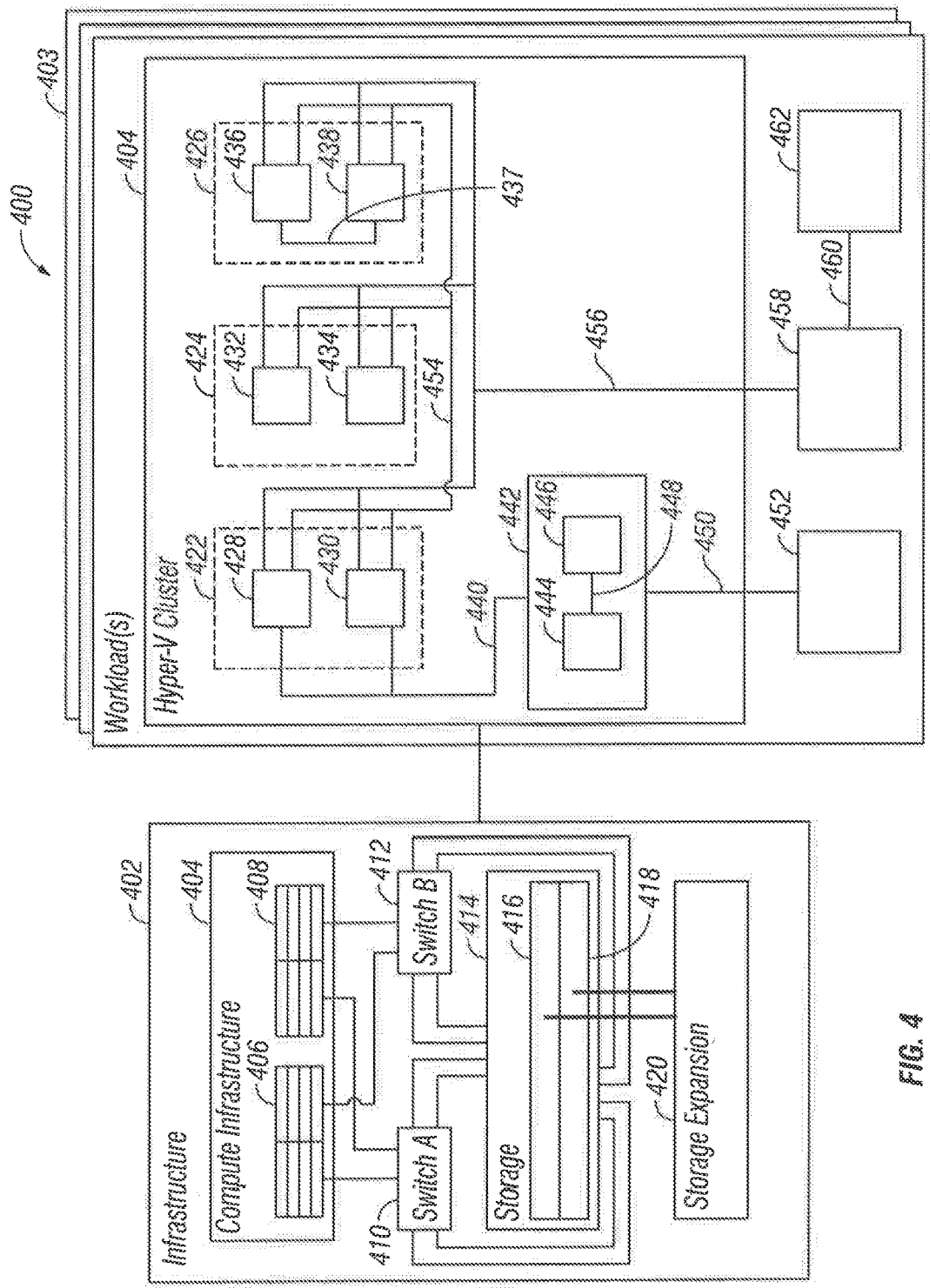
FIG. 4 is a block diagram of a graphical display of a workload recommendation from a visualization engine, in accordance with embodiments of the present disclosure.

Referring now to FIG. 4, a block diagram of a graphical display 400 of a workload recommendation 403 from a visualization engine 206 is shown, in accordance with embodiments of the present disclosure. Infrastructure 402, which may represent at least part of the hardware already present in the information handling system, also known as the brown-field infrastructure. Infrastructure 402 may include compute infrastructure 404, networking infrastructure including switches 410 and 412, and storage infrastructure including 414, 416, 418, and 420. Although separate compute, storage, and networking infrastructures are shown, an infrastructure may use a converged or hyper-converged solution, which may combine more than one type of infrastructure. Compute infrastructure 404 may include one or more server chassis 406 and 408. The server chassis may represent a particular model of server, such as the Dell PowerEdge FX Chassis. Each server chassis may include one or more servers, such as the Dell FC630 server. Although two server chassis are shown, each with eight servers, any number of server chassis with any number of servers suitable for an information handling system may be used.

The storage infrastructure may include storage array 414 and storage expansion 420. Storage array 414 may contain any suitable number of slots. Each slot in the storage array may include a storage device. For example, the Dell Storage SC4020 includes 24 slots, each of which may be capable of holding a 2.5" storage device. Storage array 414 may contain one or more controllers 416 and 418. Each controller may include a secondary information handling system with a processor subsystem, a memory subsystem, a network subsystem, and/or an I/O subsystem. The network subsystem of storage array 414 may use any suitable type of interface to connect to other devices, including Fibre Channel or iSCSI. Although four ports are shown for each controller, any number of ports suitable to connect storage 414 to other devices may be used. The network subsystem may connect storage array 414 to the networking infrastructure, which may include switches 410 and 412.

The I/O subsystem of the storage array 414 may interface with storage expansion 420. Storage expansion 420 may be an expansion enclosure, which may include another number of slots suitable for expansion. For example, Dell Storage SC220 includes 24 slots, each of which may be capable of holding a 2.5" storage device. Storage expansion 420 may interface with the I/O subsystem of storage array 414 to read and write data. Each controller 416 and 418 in storage array 414 may include an interface via its I/O subsystem to storage expansion 420. Any interface suitable for communication with storage may be used, including SAS.

The networking infrastructure may connect the compute infrastructure with the storage infrastructure. For example each server chassis in compute infrastructure 404 may contain two networking ports. One networking port may route to a first switch 410 and the other networking port may route to a second switch 412. Using two ports for a server chassis may enable the networking infrastructure to speed up communication, balance network load, and/or to provide redundancy. The storage infrastructure may also connect to the two switches. For example, the storage infrastructure may include two controllers, each using four ports. Similar to the two ports on a server chassis, the eight ports on the storage array 414, enable the storage device to speed up communication, balance network load and/or provided redundancy. For example, if the first switch fails, the server chassis may maintain communication with storage 414 via the second switch. Although two ports on each server chassis, two switches, and eight ports on the storage infrastructure are shown, any number of ports and any number of switches suitable for fast, efficient, and/or redundant communication may be used.

The visualization may associate infrastructure 402 with one or more recommended workload(s) 403. The user may have a choice to select between the different workloads to view additional information about a given workload. Workload(s) 403 may display the software and configuration of the software. Although an example workload is shown with a Hyper-V cluster, any workload suitable for pre-design and pre-validation that uses the displayed infrastructure may be shown. Workload(s) 403 may include a Hyper-V cluster 404, which may be connected to the end user access 452 and active directory domain 458. End user access 452 may enable end users to interface over a front end network link 450 to the Hyper-V cluster. Active directory domain 458 may be connected via customer defined networking 460 to one or more an active directory domain controllers 462. The active directory domain 458 may manage the user logon process for the Hyper-V cluster via management network link 456.

Within Hyper-V cluster 404, the workload may be separated into multiple tiers. For example, Exchange Server may include two tiers: a mailbox tier and a client access tier. As another example, a SharePoint workload as illustrated may include three tiers: a front end or web tier 422, an application tier 424, and a database tier 426. Front end tier 422 may include one or more virtual machines to provide a web service to end users. For example, front end tier 422 may include virtual machine 428 and virtual machine 430. Front end tier 422 may interface via front end network 440 to load balancer unit 442. Load balancer unit 442 may include one or more load balancers to share the load between the virtual machines in front end tier 422. For example, load balancer unit 442 may include load balancer 444 connected to load balancer 446 via a load balancer private network 448. Accordingly, an end user request to the web service may be routed by the load balancer unit to a particular virtual machine within the front end.

Front end tier 422 may provide access to applications running on application tier 424. Application tier 424 may include one or more applications, such as Microsoft Office Web Apps, for the end user. For example, application tier 424 may include application 432 for Microsoft Excel and application 434 for Microsoft Visio. Application tier 424 may interface with the other tiers of the workload via application network 454.

Database tier 426 may support application tier 424 and front end tier 422 with data. Database tier 426 may include one or more databases. For example, database tier 426 may include database 436 and database 438. The databases in database tier 426 may be connected via database private network 437, which may be an SQL private network to support SharePoint. The three tiers of the workload may interface with each other and the active directory domain 458 using management network 456 to ensure proper operation of SharePoint.

Although three tiers for a SharePoint workload are shown, any number of tiers with any suitable configuration supporting any workload may be displayed to the user. The workload may be pre-designed, and may be pre-validated on the visualized infrastructure. In one embodiment, the recommended workload corresponds to one workload template. In another embodiment, two or more workload templates may be linked together to create a meta-template, which may be used for a multi-workload recommendation. A multi-workload recommendation may be pre-designed, pre-validated, and/or pre-tested to collect laboratory utilization data.

Figure 5:
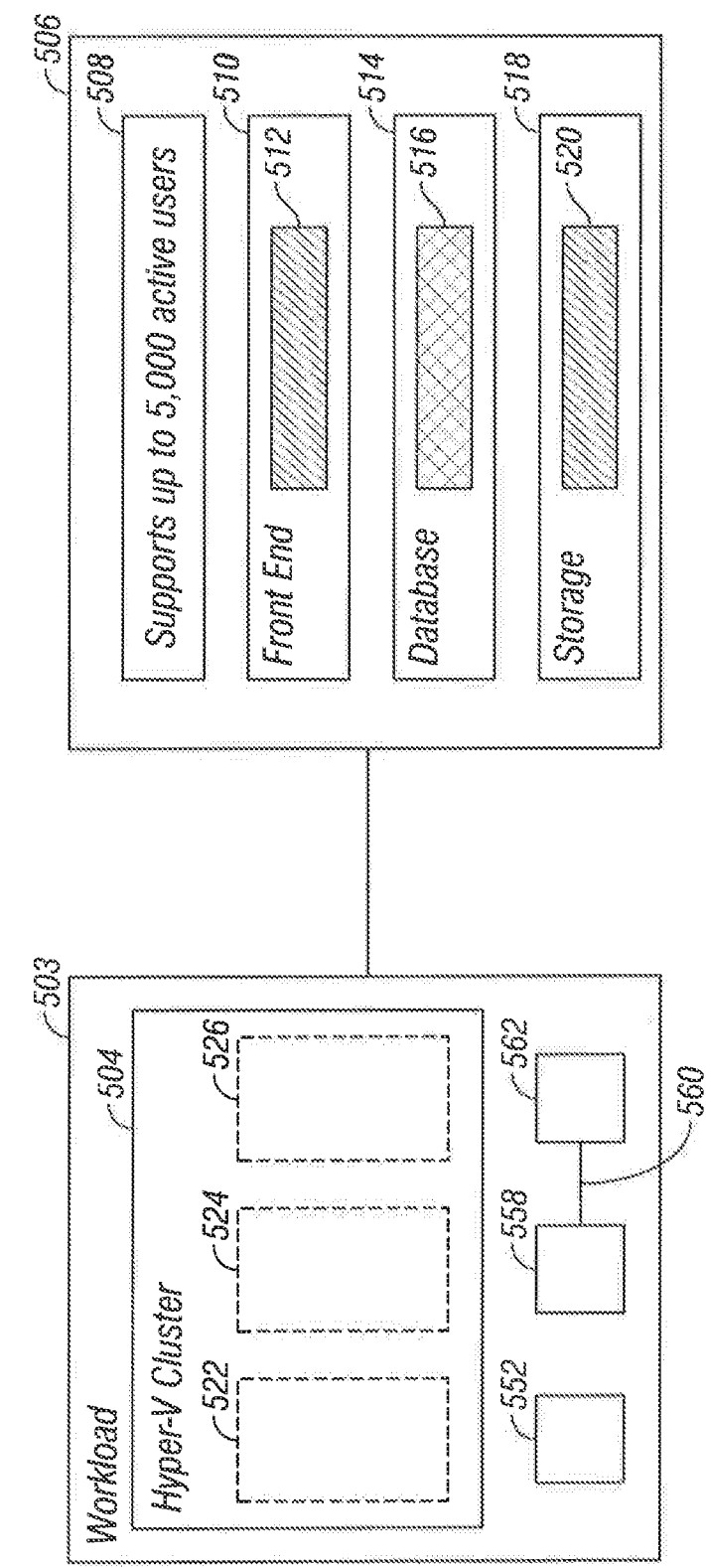
FIG. 5 is a block diagram of a graphical display of utilization information for a recommended workload on an information handling system, in accordance with embodiments of the present disclosure.

Referring now to FIG. 5, a graphical display 500 of utilization information 506 is shown for a recommended workload 503 on an information handling system, in accordance with embodiments of the present disclosure. Once a user selects a workload, the pre-validation lab results may be shown. Utilization information 506 may be displayed along with the recommended workload 503, which may have been previously selected. The visualization for recommended workload 503, also known as the selected workload, may be the same as the visualization for workload(s) 403, or may include only selected elements (as shown) from the visualization for workload(s) 403.

Utilization information 506 presents data from validated lab results and may include the number of supported users 508, the utilization for a particular tier of the workload 510 and 514, and/or the amount of required storage 518. The number of supported users 508 may convey how many users can be supported by the infrastructure and workload. This information may be displayed as the number of active users. For example, 5,000 active users may be supported by the infrastructure and workload. The utilization information for a particular tier of the workload may include the percentage of CPU utilization or processing capability utilization. For example, the utilization information 510 for the front end tier of a SharePoint workload may indicate that the infrastructure and workload have sufficient resources 512 for the number of supported end users. As another example, the utilization information 514 for the database tier of a SharePoint workload may indicate that the infrastructure and workload have marginally sufficient resources 516 for the number of supported end users. The amount of required storage 518 may display or represent how much storage is needed in the storage infrastructure. For example, utilization information 520 for the storage infrastructure may indicate that it has sufficient resources 520 for the amount of required storage estimated using the number of supported end users.

Resources notifications 512, 516, and 520 may be represented in any suitable manner including a pattern, color, and/or text. For example, green may represent sufficient resources, yellow may represent marginally sufficient resources, and red may represent insufficient resources. Sufficient may be defined as a utilization percentage equal to or less than a threshold, such as 59%. Insufficient may be defined as a utilization percentage equal to or greater than another threshold, such as 80%. Marginally sufficient may be defined as a utilization percentage that is not sufficient and not insufficient. The thresholds may be adjusted to ensure a proper recommendation, which may account for environmental variations, typical increases or decreases in utilization for a workload, and/or likelihood of component failure. The resource notification may also display what percentage utilization or storage use to expect in text format. For example, the amount of required storage 518 may display that the workload requires two terabytes of free space in the storage infrastructure.

The workload or each tier of the workload may be scaled-up or scaled-out, which may depend on the amount of load on the infrastructure. The load may be measured by any suitable metric, including the number of users serviced by the solution, the number of input/output operations serviced by the network infrastructure, and/or the number of FLOPS for the solution. The load may be binned into separate levels and each level can specify the required infrastructure.

For example, a SharePoint solution may include three tiers: a front end tier, an application tier, and a database tier. The solution template may include three levels for the solution, corresponding to 1,000 end users, 5,000 end users, and 10,000 end users. The lowest level for 1,000 end users, may define a reduced infrastructure requirement in comparison to the highest level for 10,000 end users. The reduced infrastructure requirement may include any suitable infrastructure component, including fewer processors, less memory, less storage, and/or fewer virtual machines. Although SharePoint is illustrated with three tiers and three levels, any suitable solution with any number of tiers and any number of levels may be used.

Figure 6:
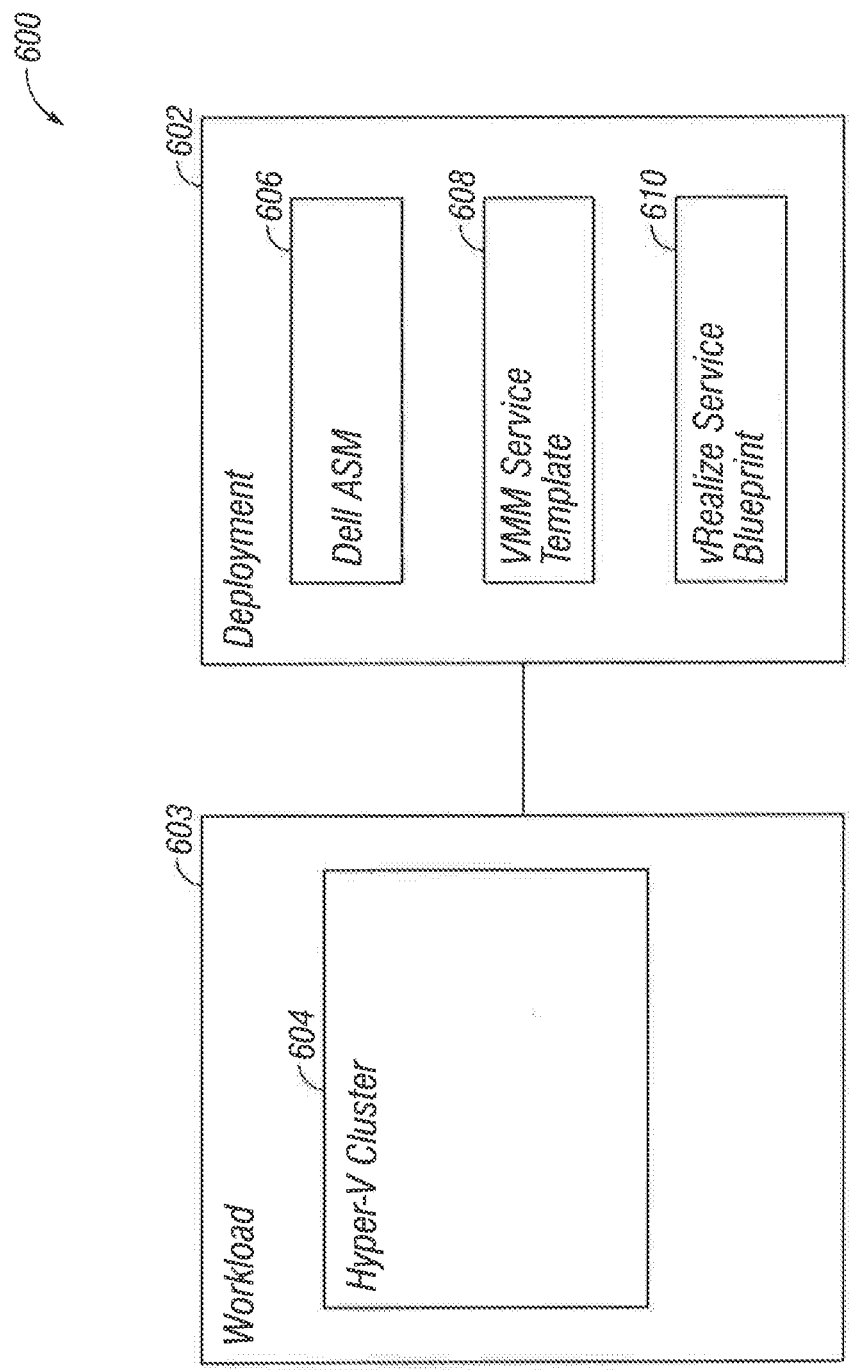
FIG. 6 is a block diagram of a graphical display of deployment options for a recommended workload on an information handling system, in accordance with embodiments of the present disclosure.

Referring now to FIG. 6, a block diagram a graphical display 600 of deployment options 602 is shown for a recommended workload 603 on an information handling system, in accordance with embodiments of the present disclosure. In addition to the utilization information for a selected workload, visualization engine 206 may display the deployment options 602 for the workload. The deployment options may include one or more infrastructure managers, which may have automation bundles for deployment. For example, three deployment options are shown in FIG. 6: Dell Active System Manager (ASM) 606, VMM Service Template 608 for Microsoft System Center Virtual Machine Manager (SCVMM), or vRealize Service Blueprint 610 for VMware. In addition, each of the options may display the compute, network, and/or storage infrastructure necessary for deployment.

Automation bundles may facilitate deployment with validated best practices. Validated best practices may include providing rules for the infrastructure manager or providing the configuration to the infrastructure manager. For example, the automation bundle may provide anti-affinity rules of the virtual machines, or provide the configuration for live migration settings or vMotion settings for each tier in the workload.

Figure 7:
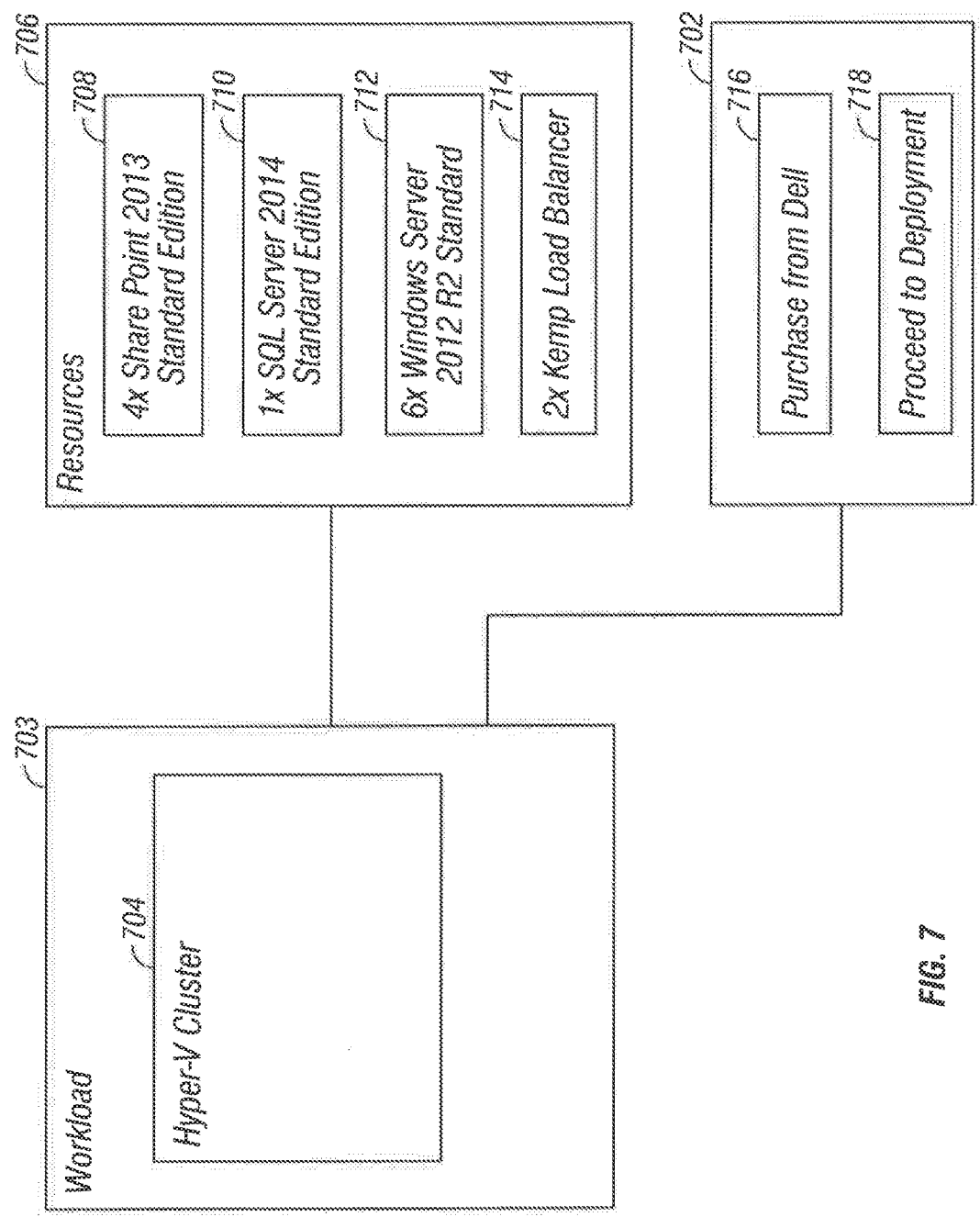
FIG. 7 is a block diagram of a graphical display of resource requirements for a recommended workload on an information handling system, in accordance with embodiments of the present disclosure.

Referring now to FIG. 7, a graphical display 700 of resource requirements 706 is shown for a recommended workload 703 on an information handling system, in accordance with embodiments of the present disclosure. If a user chooses to deploy a workload, the visualization engine may display the resources 706 required and the options 702 for those resources. In one embodiment, all of the resources required may be displayed with a notification indicating which resources are already deployed or purchased. The notification may include a pattern, color, or text. In another embodiment, the visualization engine may receive from the infrastructure manager which resources exist in the existing infrastructure and correlate these resources with the resources required by the infrastructure and workload templates. The resources may include the type and number of hardware, the type and number of applications, the type and number of databases, the type and number of operating systems, the type and number of hypervisors, and the type and number of load balancers. For example, FIG. 7 illustrates that a SharePoint workload may require four SharePoint 2013 Standard Edition licenses 708, one SQL Server 2014 Standard Edition license 710, six Windows Server 2012 R2 Standard licenses 712, and two Kemp load balancers 714. Although these specific resources are shown, any type and number of resources may be shown sufficient to enable deployment of a workload.

If the visualization engine determines that the chosen workload requires additional resources, a purchase option 716 may appear, prompting a purchase, which may use the ordering system interface. Otherwise the visualization engine may determine that the chosen workload does not require additional resources and displays a proceed to deployment option 718. The visualization engine may consider the existing or brown-field infrastructure before making a recommendation or displaying an option.

Proceed to deployment option 718 may initiate deployment of the workload, which may include one or more steps. For example, the virtual machines may be created, the applications may be installed on those virtual machines, and the applications may be configured.

Figure 8:
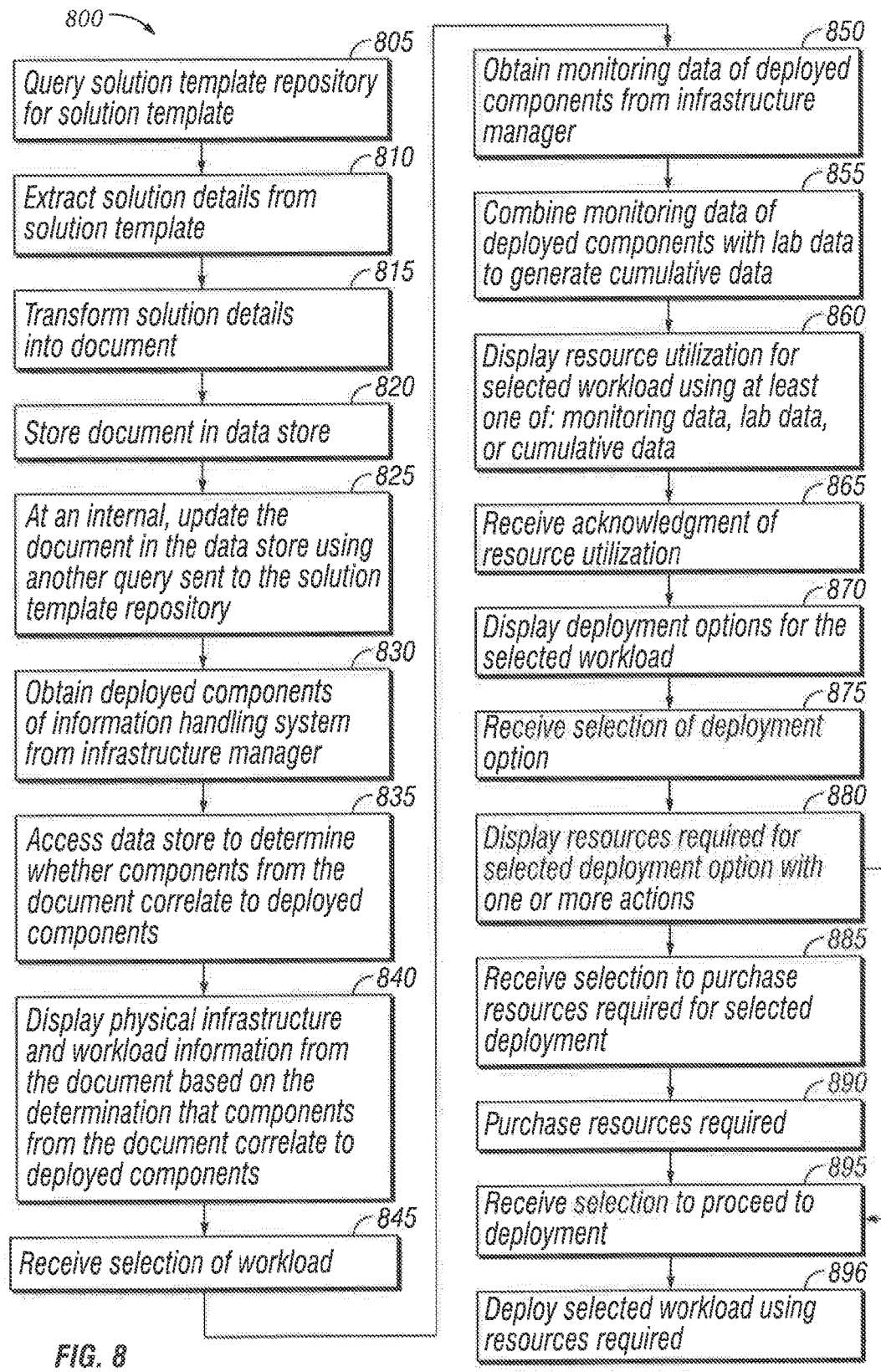
FIG. 8 is a flow chart of a method for deploying a recommended workload on an information handling system, in accordance with embodiments of the present disclosure.

Referring now to FIG. 8, a flow chart of a method for deploying a recommended workload on an information handling system, in accordance with embodiments of the present disclosure is shown. Method 800 may be implemented by any of the elements shown in FIGS. 1-7. Method 800 may be initiated by any suitable criteria and may initiate operation at any suitable point. In one embodiment, method 800 may initiate operation at 805. Method 800 may include greater or fewer steps than those illustrated. Moreover, method 800 may execute its steps in an order that is different than those illustrated below. Method 800 may terminate at any suitable step. Moreover, method 800 may repeat operation at any suitable step. Portions of method 800 may be performed in parallel and repeat with respect to other portions of method 800.

At 805, a solution template may be queried from the solution template repository or solution database. The query may be performed by the infrastructure manager or the solution property extractor service. The query may be routed through an ordering system interface to the solution database. The ordering system interface may protect access to the solution database to reduce the likelihood of tampering. Protection may include any suitable mechanism, including read-only access and/or restricted access. Read-only access may prevent the modification of solution templates. Restricted access may prohibit access to cost details associated with the solution templates, but may permit access to other information in the solution templates. The response from the query may be received by the requestor.

The solution database may be used for multiple purposes. For example, the solution database may be used to service an existing information handling system, and/or may be used by a sales team to sell information handling systems. The solution database may facilitate these purposes by including infrastructure templates, workload templates, and automation bundles. Each infrastructure template may be linked to one or more workload templates. Each workload template may be linked to one or more automation bundles or may not be linked to any automation bundle at all. Infrastructure templates may specify the hardware and software infrastructure. Workload templates may specify the configuration for the infrastructure, including virtualized workloads and non-virtualized workloads. Automation bundles may specify the steps for deploying a workload on a particular type of infrastructure manager. The steps may include rules for the infrastructure manager and/or configuration information for the infrastructure manager. Rules for the infrastructure manager may include any suitable rule, including virtual machine anti-affinity rules. Configuration information for the infrastructure manager may include any suitable configuration for a workload, including live migration settings for each tier of the workload and/or vMotion settings for each tier of the workload.

The solution templates stored in the solution database may pre-design the infrastructure for a particular usage scenario or workload. Pre-design may include the selection of the compute infrastructure, network infrastructure, storage infrastructure, software license infrastructure, software configuration, and information handling system configuration. In addition, the solution templates stored in the solution database may be pre-validated. The pre-validation may be performed by the designer or another person. Pre-validation may include testing a particular workload or set of workloads on an infrastructure configured for the workload. Pre-validation may include gathering utilization data on the infrastructure running the workload or set of workloads. Pre-validation may be performed before storage of the solution in the solution database and may be performed on the same or another information handling system.

The utilization data may include a raw number, such as the amount of storage required for the solution, or a relative number, such as the percentage of infrastructure utilization by the solution. The utilization data may be embedded in the workload template or may be a separate data structure linked to the workload template. The utilization data may provide information on whether a particular infrastructure can sufficiently support a workload. Workload templates may separate the requirements of the workload into separate tiers. Each tier may be configured for a particular purpose. For example, a front end tier may be configured to provide a web interface for end users. The tiers of a workload may communicate with each other to facilitate a complete solution. Each tier of the workload may be scaled-up or scaled-out, which may depend on the amount of load on the solution. The load may be measured by any suitable metric, including the number of users serviced by the solution, the number of input/output operations serviced by the network infrastructure, and/or the number of FLOPS for the solution. The load may be binned into separate levels and each level can specify the required infrastructure.

At 810, solution details are extracted from the queried solution template. Solution details may include the infrastructure template. The infrastructure template may be linked to one or more workload templates. Each workload template may be linked to one or more automation bundles, or may not be linked to any automation bundle. Each workload template may include or may be linked to utilization data for the workload, which may include or be linked to scale-up/scale-out options for the workload. The solution details may not include all details in the queried solution template. For example, the queried solution template may include information associated with automation bundles for various infrastructure managers that are not used on the information handling system, in which case the solution details may not include any information associated with these automation bundles.

At 815, the solution details are transformed into a document. The document may include all of the solution details or may include only parts of the solution details. For example, the solution details may include information associated with automation bundles for various infrastructure managers that are not used on the information handling system, in which case the document may not include any information associated with these automation bundles. The document may be in a JavaScript Object Notation (JSON) format, which may be human-readable.

At 820, the document may be stored in the data store. The data store may be a database or other suitable structure for storing documents. In one embodiment, the data store may be a NoSQL database, such as MongoDB, DocumentDB, or Couchbase Server. In another embodiment, the data store may be distributed, such as a Hadoop infrastructure. In a further embodiment, the data store may be a columnar database rather than a relational database. In yet another embodiment, the data store is an SQL database.

At 825, the document in the data store may be updated. The update may occur at an interval. In one embodiment, the update may be a pull, which may include querying the solution database and occurs at a regular interval, such as every hour or every week. In another embodiment, the update may be a push, which may include the solution database or ordering system interface sending the solution template when it is updated. The update may involve receiving the updated solution template, extracting solution details from the updated solution template, transforming the solution details into a document, merging the document with the existing document, and storing the merged document in the data store, which may replace the existing document in the data store.

At 830, the components deployed on the information handling system may be obtained from the infrastructure manager. The infrastructure manager may be aware of what components exist on the information handling system. The components may include the hardware and software infrastructure. The hardware infrastructure may include the compute infrastructure, storage infrastructure, and/or networking infrastructure. The software infrastructure may include the types of software licenses, and the number of software licenses. A visualization engine may obtain the deployed components from the infrastructure manager. In one embodiment, the visualization engine may be an add-on to the infrastructure manager. In another embodiment, the visualization engine may be a feature embedded into the infrastructure manager.

At 835, the visualization engine or infrastructure manager may access the data store to determine whether components from the document stored into the data store correlate to the deployed components. At least one component from the stored document must correlate to the deployed components. In one embodiment, all of the deployed components may exist in the stored document and the correlation may be an exact match. In another embodiment, some of the deployed component may exist in the stored document and the correlation may be a partial match. For example, the hardware infrastructure may exist in the stored document. The data store may contain more than one document, in which case the data store may be accessed one or more times. For example, the access may involve a query to the data store using one or more deployed components. The result of the query may be that more than one document correlates to the deployed components.

At 840, the visualization engine may display at least one solution based on the determination that components from the document correlate to the deployed components. The display may include the physical infrastructure and/or the workload information from the document. The physical infrastructure may include the compute infrastructure, which may include the type and number of servers; the storage infrastructure, which may include the type and number of storage arrays; and/or the network infrastructure, which may include the type and number of switches. The workload information may include the types of tiers in the workload, the number of virtual machines for each tier, and/or the number of load balancers. More than one document may correlate to the deployed components, in which case the visualization engine may display more than one solution. The solutions may be displayed graphically as cards, in which case parts of the information displayed by a solution may be covered by the card for another solution.

At 845, a selection of the workload may be received. The selection may have involved a user selecting a workload with an input device, such as a keyboard, mouse, or touch-enabled surface. The user, who may be an administrator for the information handling system, may have browsed and/or viewed the one or more solutions displayed.

At 850, the monitoring data of components deployed on the information handling system may be obtained. The monitoring data for the information handling system may have been previously collected by the infrastructure manager. The infrastructure manager may monitor the information handling system to collect any suitable metric, including the utilization of the infrastructure, or any part or component of the infrastructure. The utilization may be recorded in raw form, such as the amount of storage used by the infrastructure, or may be recorded in relative form, such as the percentage utilization of the compute infrastructure. The utilization may also be recorded for entire workloads, or any component of a workload, such as the front end tier or the load balancer. The visualization engine may obtain the monitoring data, or the infrastructure manager may obtain the monitoring data, in which case the monitoring data may be stored in another part of the infrastructure manager or may be stored external to the infrastructure manager.

At 855, the visualization engine may combine the monitoring data with the utilization data from the document with components that correlate to the deployed components. The combination may include combining utilization information for unused components deployed in the information handling system, or for deployed components that are used. In one embodiment, the combination may involve an attempt to estimate the utilization of the information handling system with multiple workloads. The estimation may require an estimation multiple to account for cumulative effects from multiple workloads. For example, running one workload for SharePoint and one workload for Skype for Business on the same information handling system may utilize more resources than running the two workloads separately and summing the utilization information.

At 860, the visualization engine may display the resource utilization for the selected workload. In one embodiment, the resource utilization may include the monitoring data. In another embodiment, the resource utilization may include the utilization data collected in the lab during pre-validation. In a further embodiment, the resource utilization may include the cumulative data. In yet another embodiment, the resource utilization may be displayed using the utilization data collected in the lab during pre-validation and the display may include an option to scale-up/scale-out the workload. The scaling option may default to the highest level for the workload or may default to the appropriate level based on the monitoring data. The appropriate level may be determined by selecting one or more metrics from the monitoring data and finding the level nearest, but still greater than the selection.

The resource utilization may be displayed using any suitable information, including text, patterns, and/or colors. The text may indicate the number of users supported or the peak utilization percentage for the workload or tier of the workload. The colors may indicate whether the resource utilization is sufficient (e.g., green), marginally sufficient (e.g., yellow), or insufficient (e.g., red). Sufficient may be defined as a utilization percentage equal to or less than a threshold, such as 59%. Insufficient may be defined as a utilization percentage equal to or greater than another threshold, such as 80%. Marginally sufficient may be defined as a utilization percentage that is not sufficient and not insufficient. The thresholds may be adjusted to ensure a proper recommendation, which may account for environmental variations, typical increases or decreases in utilization for a workload, and/or likelihood of component failure.

At 865, an acknowledgement may be received for the resource utilization. The acknowledgement may include the selection of an acknowledgement button, which may include text such as "accept," "okay," or "next." A disclaimer regarding the accuracy of the resource utilization data may be provided for legal purposes and the acknowledgement may agree to the terms of the disclaimer or agreement. The acknowledgement may also include the selection of a scaling level option for the workload.

At 870, the visualization engine may display deployment options for the selected workload. The deployment options may include one or more infrastructure managers or cloud managers, such as Dell Active System Manager (ASM) or VMware vRealize. In one embodiment, the deployment options may list all of the available options and may list whether an automation bundle is linked to the option. In another embodiment, the deployment options listed may be only those with an linked automation bundle.

At 875, a selection of a deployment option may be received. At 880, the visualization engine may display the resources required for the selected deployment and one or more actions. The displayed resources may include the type and number of various components for the infrastructure and workload. In one embodiment, an automation bundle may not be available, which case, the action displayed may be an acknowledgement button. In another embodiment, an automation bundle may be available and the required resources may already exist on the information handling system. In this case, an action associated with proceeding to deployment may be displayed. In a further embodiment, an automation bundle may be available and the required resources may exceed what exists on the information handling system. In this case, an action associated with purchasing additional infrastructure may be shown.

At 885, a selection may be received to purchase any additional resources that may be required for the selected deployment. At 890, the additional resources required may be purchased. For example, the existing resources may only have three instances or hosts of cloud infrastructure purchased, but the selected deployment may require four instances. In this case, an additional instance or host of cloud infrastructure may be purchased. After the purchase, the visualization engine may return to display the resources required for the selected deployment with the additional resources purchased or the visualization engine may present an action for proceeding to deployment directly from the completed purchase. At 895, a selection may be received to proceed to deployment. At 896, the selected workload may be deployed using the required resources and the selected deployment option. An automation bundle may auto-deploy the selected workload using validated best practices.

As disclosed herein, workload recommendations for an information handling system may be identified, displayed, and deployed using an infrastructure manager. The infrastructure manager may reside on the information handling system or may be a secondary information handling system communicatively coupled to the information handling system for which the workload is recommended. The workload recommendation may be deployed on existing, brown-field infrastructure.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method of deploying a recommended workload on an information handling system comprising:
    extracting solution details from a solution template queried from a solution template repository, wherein the solution details include infrastructure information and workload information from the solution template;
    transforming the solution details into a document;
    storing the document in a data store;
    obtaining existing components of the information handling system;
    accessing the data store to extract components required by the document corresponding to at least one of: the infrastructure information or the workload information;
    determining whether the existing components of the information handling system correlate to the components required by the document;
    displaying the recommended workload based on the determination that the existing components of the information handling system correlate to the components required by the document, wherein the recommended workload includes the infrastructure information and workload information from the document;
    deploying the recommended workload based on a selection of the recommended workload;
    obtaining monitoring data of the existing components of the information handling system; and
    displaying a resource utilization for the selected workload based on the monitoring data.

2. The method of deploying a recommended workload on an information handling system in claim 1 further comprising, at an interval, updating the document in the data store using a query sent to the solution template repository.

3. The method of deploying a recommended workload on an information handling system in claim 1, wherein the solution details further include laboratory data collected for the solution template, and further comprising displaying a resource utilization for the selected workload based on the laboratory data collected for the solution template.

4. The method of deploying a recommended workload on an information handling system in claim 1, further comprising:
    displaying resources required for the selected workload and deployment options for the selected workload, the deployment options including an option to purchase at least one of the resources required; and
    receiving a selection for the option to purchase.

5. The method of deploying a recommended workload on an information handling system in claim 1, wherein the solution template is pre-designed and pre-validated.

6. The method of deploying a recommended workload on an information handling system in claim 1, wherein the step of deploying the recommended workload further includes scaling the deployment for the information handling system.

7. An information handling system, comprising:
    a processor subsystem having access to memory;
    an infrastructure manager executable on the processor subsystem to deploy a recommended workload, wherein the memory stores instructions executable by the processor subsystem to:
        extract solution details from a solution template queried from a solution template repository, wherein the solution details includes infrastructure information and workload information from the solution template;
        transform the solution details into a document;
        store the document in a data store;
        obtain existing components of the information handling system;
        access the data store to extract components required by the document corresponding to at least one of: the infrastructure information and the workload information;
        determine whether the existing components of the information handling system correlate to the components required by the document;
        display the recommended workload based on the determination that the existing components of the information handling system correlate to the components required by the document, wherein the recommended workload includes the infrastructure information and workload information from the document;
        deploy the recommended workload based on a selection of the recommended workload;
        obtain monitoring data of the existing components of the information handling system; and
        display a resource utilization for the selected workload based on the monitoring data.

8. The information handling system of claim 7, wherein the instructions are further executable by the processor subsystem to, at an interval, update the document in the data store using a query sent to the solution template repository.

9. The information handling system of claim 7, wherein the solution details further include laboratory data collected for the solution template, and the instructions are further executable by the processor subsystem to display a resource utilization for the selected workload based on the laboratory data collected for the solution template.

10. The information handling system of claim 7, wherein the instructions are further executable by the processor subsystem to:
   display resources required for the selected workload and deployment options for the selected workload, the deployment options include an option to purchase at least one of the resources required; and
   receive a selection for the option to purchase.

11. The information handling system of claim 7, wherein the solution template is pre-designed and pre-validated.

12. The information handling system of claim 7, wherein the deployment of the recommended workload further includes instructions executable by the processor subsystem to scale the deployment for the information handling system.

13. At least one non-transitory machine readable storage medium, comprising computer-executable instructions carried on the non-transitory computer-readable medium, the instructions readable by a processor, the instructions when read and executed, cause the processor to perform a method of an infrastructure manager for an information handling system, comprising:
   a solution property extractor service to:
      extract solution details from a solution template queried from a solution template repository, wherein the solution details include infrastructure information and workload information from the solution template; and
      transform the solution details into a document;
   a data store to store the document; and a visualization engine to:
      access the data store to extract components required by the document corresponding to at least one of: the infrastructure information or the workload information;
      determine whether the existing components of the information handling system correlate to the components required by the document; and
      display a recommended workload based on the determination that the existing components of the information handling system correlate to the components required by the document, wherein the recommended workload includes the infrastructure information and workload information from the document;
      deploying the recommended workload based on a selection of the recommended workload;
      obtaining monitoring data of the existing components of the information handling system; and
      displaying a resource utilization for the selected workload based on the monitoring data.

14. The at least one non-transitory machine readable storage medium of claim 13, wherein the solution property extractor service is to further, at an interval, update the document in the data store using a query sent to the solution template repository.

15. The at least one non-transitory machine readable storage medium of claim 13, wherein the solution details further include laboratory data collected for the solution template, and the visualization engine is to further display a resource utilization for the selected workload based on the laboratory data collect for the solution template.

16. The at least one non-transitory machine readable storage medium of claim 13, wherein the visualization engine is further to: display resources required for the selected workload and deployment options for the selected workload, the deployment options include an option to purchase at least one of the resources required; and receive a selection for the option to purchase.

17. The at least one non-transitory machine readable storage medium of claim 13, wherein visualization engine further deploys the recommended workload by scaling the deployment for the information handling system.

* * * * *